United States Patent [19]

Nagai

[11] Patent Number: 5,559,572
[45] Date of Patent: Sep. 24, 1996

[54] CAMERA

[76] Inventor: Shinichi Nagai, 17-2, Kitanakafuri 3-chome, Hirakata-shi, Oaka-fu, Japan

[21] Appl. No.: 248,237

[22] Filed: May 24, 1994

[30] Foreign Application Priority Data

Apr. 11, 1994 [JP] Japan .................. 6-003622 U

[51] Int. Cl.⁶ .................................................. G03B 17/02
[52] U.S. Cl. ................................................................. 354/288
[58] Field of Search .......................... 354/288; 352/60, 352/57, 93, 94

[56] References Cited

U.S. PATENT DOCUMENTS 1,136,236  4/1915  Killman .
1,515,429  11/1924  Bouin .
1,703,818  2/1929  Hadaway .
1,815,208  7/1931  Moraz .
4,121,233  10/1978  Hudspeth .
5,257,055  10/1993  Cho et al. .

*Primary Examiner*—David M. Gray

[57] ABSTRACT

A camera is provided which is capable of photographing a subject without being directed to the subject. The camera includes a camera body equipped with optical lenses including an objective lens and a viewfinder lens, and a film loaded in the camera body. The objective lens and a photographing portion of the film being slanted with respect to the camera body.

5 Claims, 3 Drawing Sheets

CAMERA

BACKGROUND OF THE INVENTION

The present invention relates to a camera and, more particularly, to a camera capable of taking a snapshot of a natural pose of a person or of a living animal.

A conventional camera has an objective lens disposed parallel to and on a front surface of a camera body. Therefore, when photographing a subject such as a person, the camera is directed to the subject.

The subject, however, becomes conscious of the camera willingly or unwillingly when facing the camera. Hence, it is not easy for the photographer to take a snap of the subject in its natural pose. A person who dislikes to be photographed, in particular, is likely to turn away or go away when merely watched by the camera. In this way it is rather difficult to take a good photograph.

Further, where an animal is to be photographed, the animal is likely to be surprised by light reflected from the lens of the camera and to flee away. Thus, the photographer has a difficulty in taking a photograph of a natural scenery.

In view of the foregoing, it is an object of the present invention to provide a camera capable of photographing a subject without the need of directing the camera to the subject.

SUMMARY OF THE INVENTION

In accordance with the present invention, there is provided a camera comprising a camera body equipped with optical lenses including a objective lens and a viewfinder lens, and a film loaded in the camera body, the objective lens and a photographing portion of the film being slanted with respect to the camera body.

Preferably, the photographing portion of the film is slanted by a roller guiding the passage of the film.

In the camera according to the present invention, the objective lens and the photographing portion of the film are slanted with respect to the camera body. Hence, light reflected from a subject is possible to be focused on the film thereby to form the image of the subject thereon, with the camera itself not being directed to the subject. Therefore, a photographer is able to photograph a natural pose of the subject such as a person or an animal without being noticed of the camera by the subject.

DETAILED DESCRIPTION

A camera according to the present invention will now be described in detail with reference to the attached drawings.

Figure 1:
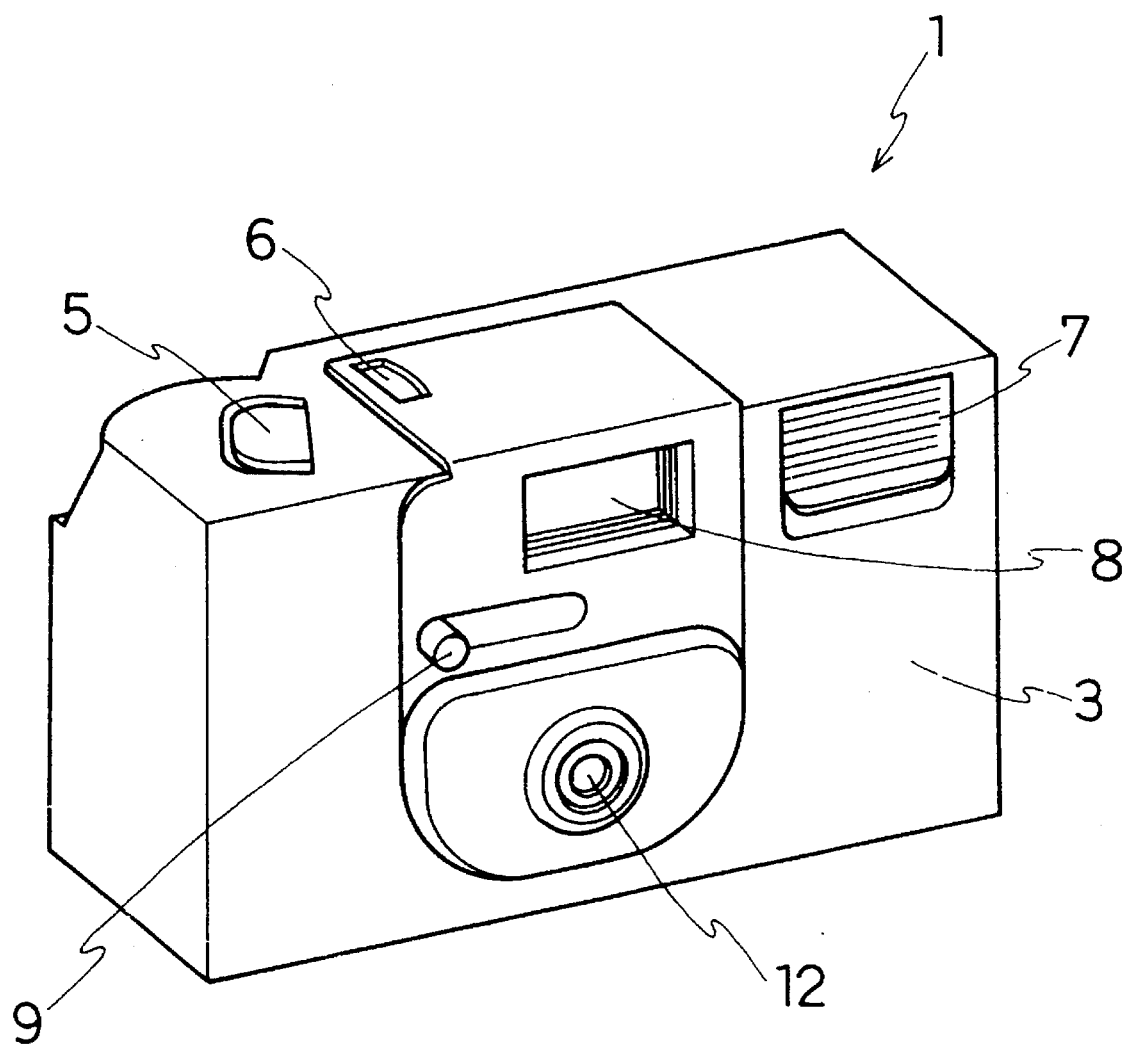
FIG. 1 is a perspective view showing one embodiment of a camera according to the present invention.
Figure 2:
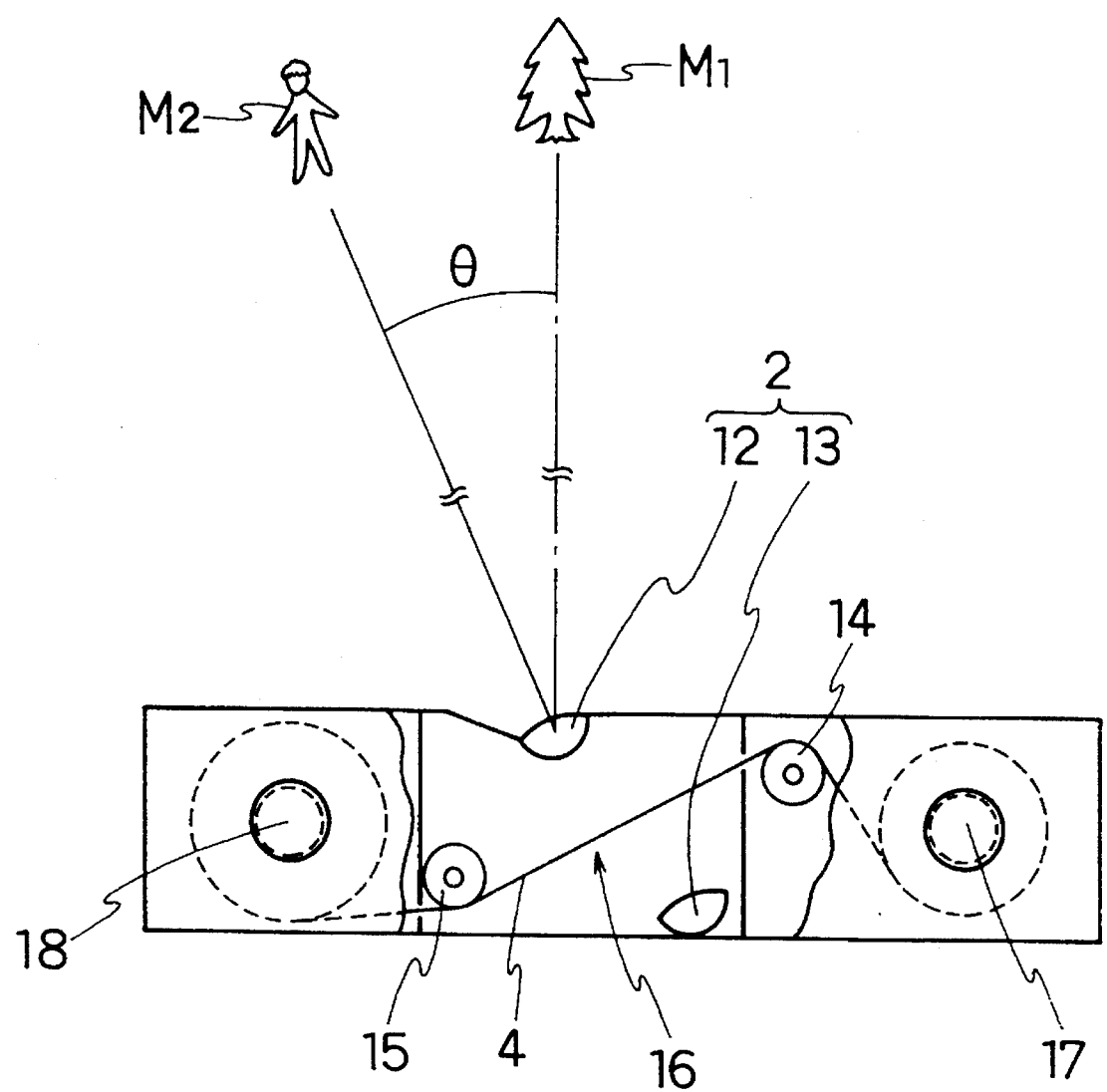
FIG. 2 is a partially cut-away schematic plan view of the camera shown in FIG. 2.

Referring to FIGS. 1 and 2, a camera 1 includes a camera body 3 having an optical lens 2 positioned centrally of the camera body 3 and a film 4 loaded in the camera body 3. The film 4 is wound about both film rolls 17 and 18.

Figure 3:
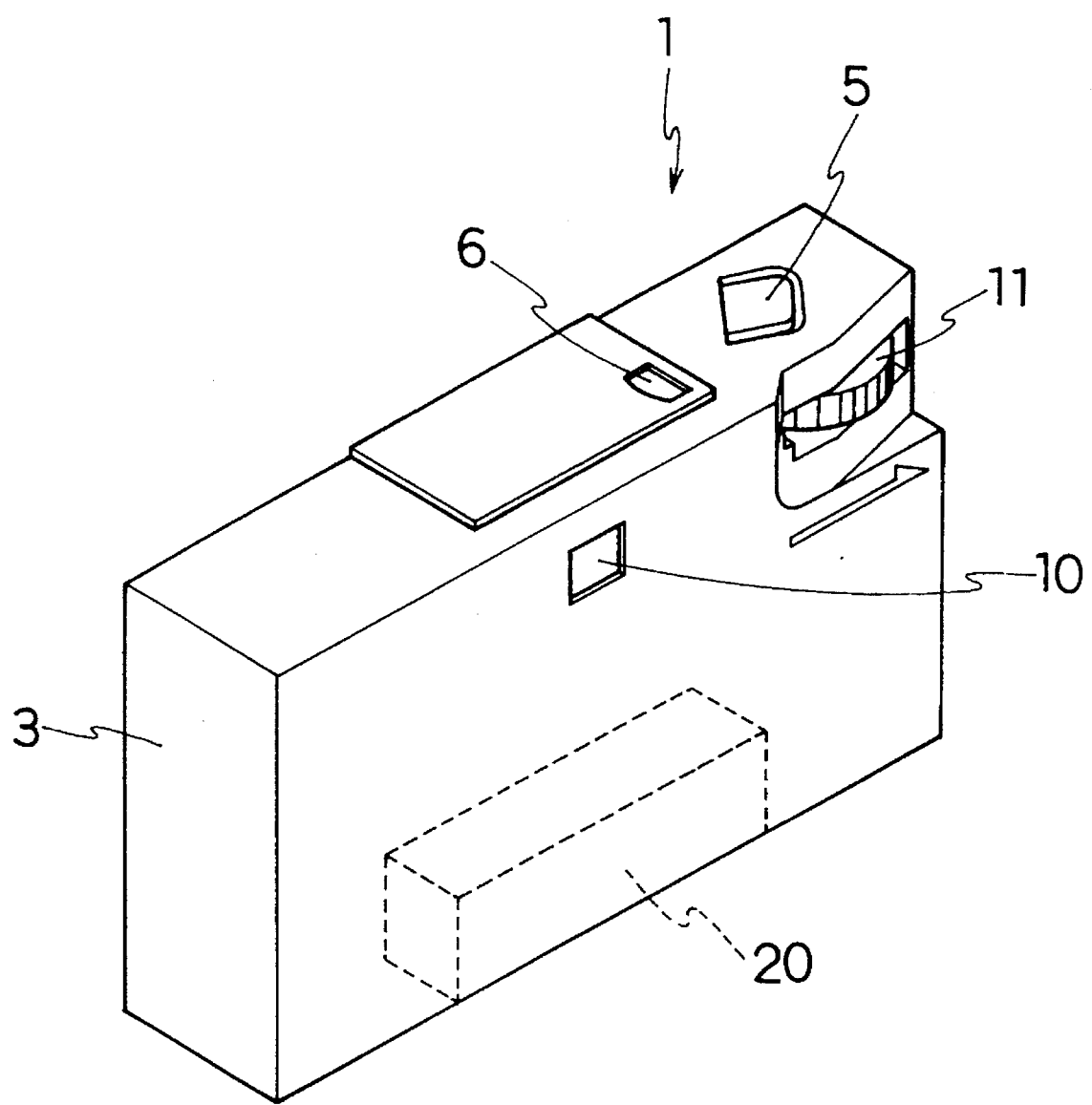
FIG. 3 is a perspective view, as viewed from behind, of the camera shown in FIG. 1.

The camera body 3 is equipped on its top surface a shutter release button 5, film frame counter 6 and the like. On the front surface of the camera body 3 are provided a flash 7, a viewfinder window 8 and a mode selector button 8 for switching from a standard photography mode to a panoramic photography mode and vice versa. On the rear surface of the camera body 3 are provided a viewfinder eyepiece window 10, a nob 11 for winding the film 4 and the like ( refer to FIG. 3 ). Further, in a bottom portion of the camera body 3 is provided a battery chamber 20 for accommodating a battery for the flash 7. This battery chamber 20 might be shaped vertically elongated and disposed on a side portion of the camera body 3, and the location of the chamber 20 is not particularly limited in the present invention.

It should be noted that the present invention is not limited to these components and might be equipped with, for example, a flash button.

The aforementioned optical lens 2 comprises one convex objective lens 12 slantedly attached to the front surface of the camera body 3 and a viewfinder lens 13 disposed above and behind the objective lens 12 and in the viewfinder eyepiece window 10. The viewfinder lens 13 might be a lens identical with the objective lens 12. Angle θ at which the objective lens 12 is slanted might be, for example, 10° or 20° but is not particularly limited thereto in the present invention. It should be noted that the viewfinder lens 13 is desirably slanted to substantially the same degree as the objective lens 12 for easy sight of the subject. Likewise, the flash 7 also is desirably slanted to substantially the same degree as the objective lens 12 so as to assuredly brighten the subject and its periphery.

The film 4 travels as guided by rollers 14 and 15 respectively disposed on the front side and rear side of the camera body 3. The plane including axes of these rollers 14 and 15 is slanted to substantially the same degree as the objective lens so that the image of the subject incoming through the objective lens 12 is brought into focus on the photographing portion 16 of the film 4. In this way, the photographing portion 16 of the film 4 is slanted by these rollers 14 and 15. This makes it possible to reduce the thickness of the camera, compared to the case where the photographing portion of the film is slanted by disposing one film roll (for example, the film roll 17 shown in FIG. 2) ahead of the other film roll (for example, the film roll 18 shown in FIG. 2). Consequently, the camera of such arrangement has a thickness substantially equal to that of the conventional camera.

Reference is then made to the operation of the camera 1.

As shown in FIG. 2, where subject $M_2$ which is located substantially away from pseudosubject $M_1$ as making angle θ therebetween is to be photographed, subject $M_2$ is aimed at through the viewfinder eyepiece window 10, while the camera 1 is directed to pseudosubject $M_1$. In this way, the image of subject $M_1$ can be focused onto the photographing portion 16 of the film 4 and, hence, mere depressing of the shutter release button 5 allows the photographer to take a picture. Since the photographer appears as if photographing pseudosubject $M_1$, the photographer is able to photograph a natural or unexpected pose of subject $M_2$ without being noticed by subject $M_2$.

As has been described, with the camera according to the present invention a photographer is able to capture the image of a subject without directing the camera to the subject since the objective lens and the photographing portion of the film are slanted. Therefore, the photographer is able to photograph a natural pose of the subject without being noticed by the subject.

While only certain presently preferred embodiments have been described in detail, as will be apparent with those familiar with the art, certain changes and modifications can be made without departing from the spirit and scope of the invention as defined by the following claims.

What is claimed is:

1. A camera for taking snapshots, comprising a camera body equipped with optical lenses including an objective lens and a viewfinder lens, and film loaded in the camera body, wherein said objective lens, said viewfinder lens and a photographing portion of said film are substantially parallel to one another and are slanted with respect to the camera body to substantially the same degree, wherein said photographing portion of said film is slanted by a roller guiding the passage of said film, and wherein the camera has a thickness substantially equal to that of a conventional camera.

2. The camera of claim 1 further comprising a flash.

3. The camera of claim 2 wherein said flash is slanted to substantially the same degree as said objective lens.

4. The camera of claim 1 wherein said objective lens, said viewfinder lens and said photographing portion of said film are slanted at an angle of 10 or 20° with respect to said camera body.

5. The camera of claim 1 further comprising a mode selector button for switching from a standard photography mode to a panoramic photography mode and vice versa.

* * * * *